United States Patent
Hu et al.

(10) Patent No.: US 7,292,513 B2
(45) Date of Patent: Nov. 6, 2007

(54) METHOD OF CORRECTING CLOCK OF COMPACT DISK AND CIRCUIT THEREOF

(75) Inventors: Pei-Jei Hu, Hsin-Tien (TW); Mel Lai, Hsin-Tien (TW); Sl Ouyang, Hsin-Tien (TW)

(73) Assignee: VIA Technologies, Inc., Taipei Hsien (TW)

( * ) Notice: Subject to any disclaimer, the term of this patent is extended or adjusted under 35 U.S.C. 154(b) by 722 days.

(21) Appl. No.: 10/767,622

(22) Filed: Jan. 28, 2004

(65) Prior Publication Data

US 2005/0135211 A1   Jun. 23, 2005

(30) Foreign Application Priority Data

Dec. 17, 2003   (TW) ............................... 92135712 A

(51) Int. Cl.
G11B 7/00   (2006.01)
(52) U.S. Cl. ............................... 369/53.34; 369/47.28; 369/59.19
(58) Field of Classification Search ............. 369/59.19, 369/47.28, 53.34; 360/51
See application file for complete search history.

(56) References Cited

U.S. PATENT DOCUMENTS 5,065,384 A * 11/1991 Yokogawa ............... 369/47.28
5,255,132 A * 10/1993 Galbraith et al. ............. 360/51
5,677,935 A * 10/1997 Karino ....................... 375/368
6,269,058 B1 * 7/2001 Yamanoi et al. ......... 369/47.28
RE37,904 E * 11/2002 Lee .............................. 386/46
6,536,011 B1 * 3/2003 Jang et al. ................... 714/814
7,050,363 B2 * 5/2006 Otsuka et al. ........... 369/47.48

FOREIGN PATENT DOCUMENTS

CN   1221189 A   6/1999

* cited by examiner

Primary Examiner—Wayne Young
Assistant Examiner—Vanessa Coleman
(74) Attorney, Agent, or Firm—J.C. Patents

(57) ABSTRACT

A circuit for correcting a clock of a compact signal and a method therefor. The method comprises: receiving a data signal and a clock signal; and generating a sync pattern signal by using the clock signal to check the data signal. Then, a detection window signal according to a clock number during a timing of a last sync pattern signal and a first preset timing is generated, and the detection window signal having a second preset timing width. Finally, a clock of the sync pattern signal and the detection window signal are compared, and the clock signal is corrected.

14 Claims, 3 Drawing Sheets

METHOD OF CORRECTING CLOCK OF COMPACT DISK AND CIRCUIT THEREOF

CROSS-REFERENCE TO RELATED APPLICATION

This application claims the priority benefit of Taiwan application serial no. 92135712, filed on Dec. 17, 2003.

BACKGROUND OF THE INVENTION

1. Field of the Invention

The present invention relates to a read/write technology of compact disks, and more particularly to a method of correcting a clock of a compact disk and a circuit thereof.

2. Description of the Related Art

As to various storage mediums for computers, compact disk (CD) has the advantages of high storage capacity, low cost and high portability, and has been widely used in the field. When data are stored in a CD, eight-to-fourteen modulation (EFM), reed-soloman modulation and interleave method is applied to process the data. The EFM means that 8-bit data are transformed into 14-bit data on a CD. 8-bit data are transformed into 16-bit data on a digital versatile disc (DVD) and stored therein.

When the data are read, radio frequency data (RF DATA) are generated from sensing the reflective laser from the CD. According to the RF DATA, the data signal DSEFM and the clock signal EFMCLK are generated. Then, a decoding of the two signals process is performed for the subsequent signal decoding process.

Because of the high-capacity, high read/write and high precision requirement for the CD, technologies, such as EFM, for improving the read/write reliability have been widely used. In order to read the data correctly, a sync pattern is put between the data. Because the data read out are a series of signals, the signals should be precisely read according to the clock signal. If the clock signal is not correct, the data signal DSEFM will be falsely decoded. Therefore, the clock signal EFMCLK should be kept in correct frequency. Prior art technologies use self frequency-lock to decode the data. CD is made from plastic and is vulnerable to scratches. If the scratch causes a defective region on CD, the prior technology does not perform self frequency-lock function. When the data in the defective region are read, the clock signal EFMCLK holds on to the last frequency of the non-defective region. Because of the failure of the self frequency-lock, the frequency of the clock signal EFMCLK shifts. After leaving the defective region, the read of the DSEFM is according to the false clock signal EFMCLK. Therefore, the data read is, of course, are not correct.

SUMMARY OF THE INVENTION

Therefore, the present invention provides a method of correcting a clock of a compact disk so that the read/write of the compact disk can be improved.

The present invention also discloses a circuit for correcting a clock signal of a compact disk so that the read/write of the compact disk can be improved.

The present invention discloses a method of correcting a clock of a compact disk. The method comprising: receiving a data signal and a clock signal; generating a sync pattern signal by using the clock signal to detect the data signal; generating a detection window signal according to a clock number during a timing of a last sync pattern signal and a first preset timing, wherein the detection window signal has a second preset timing width; then comparing a clock of the sync pattern signal with the detection window signal, and correcting the clock signal.

The present invention also discloses a circuit for correcting a clock of a compact disk. The circuit comprises: a synchronous detecting circuit, a detection window generator, and a synchronous phase detecting circuit. The synchronous detecting circuit is adapted to receive a clock signal and a data signal for generating a sync pattern signal according to the clock signal. The detection window generator is adapted to receive the clock signal and the sync pattern signal for generating a detection window signal according to a clock number during a timing of a last sync pattern signal and a first preset timing, wherein the detection window signal has a second preset timing width. The synchronous phase detecting circuit is adapted to receive the sync pattern signal and the detection window signal for comparing a clock of the sync pattern signal with the detection window signal, and for generating a frequency-correcting signal and correcting the clock signal.

According to the present invention, one end of the detection window signal adjacent to a last detection window signal is a signal front end, and another end of the detection window signal is a signal back end. A region of the detection window signal within a third preset timing and adjacent to the signal front end is a front-edge region, and a region of the detection window signal within a fourth preset timing and adjacent to the signal back end is a post-edge region. A sum of the third preset timing and the fourth preset timing is no more than the second preset timing. The step of comparing the clock of the sync pattern signal with the detection window signal comprising: determining whether the sync pattern signal is in the front-edge region, wherein if it is, a frequency-increase signal is sent out; determining whether the sync pattern signal is in the post-edge region, wherein if it is, a frequency-reduction signal is sent out; determining whether the sync pattern signal is between the front-edge region and the post-edge region, wherein if it is, a frequency-remain signal is sent out; and correcting the clock signal according to the frequency-increase signal, the frequency-reduction signal and the frequency-remain signal. Further, a fifth preset timing with a frequency-lock region between the front-edge region and the post-edge region. A sum of the third preset timing, the fourth timing and the fifth timing is no more than the second preset timing. The method of the present invention, moreover, further comprises determining whether the sync pattern signal is in the frequency-lock region, wherein if it is, the frequency-remain signal is sent out.

According to the present invention, the step of correcting the clock signal according to frequency-increase signal, the frequency-reduction signal and the frequency-remain signal comprises: measuring and determining whether a number of the frequency-increase signal is larger than a first preset counting number, wherein if it is, a frequency-increase trigger signal is generated and the number of the frequency-increase signal is reset; measuring and determining whether a number of the frequency-reduction signal is larger than a second preset counting number, wherein if it is, a frequency-reduction trigger signal is generated and the number of the frequency-reduction signal is reset; measuring and determining whether a number of the frequency-remain signal is larger than a third preset counting number, wherein if it is, a frequency-remain trigger signal is generated and the number of the frequency-remain signal is reset; and correcting the clock signal according to the frequency-increase signal, the frequency-reduction signal and the frequency-remain signal.

According to the present invention, the frequency-correcting module comprises: an ahead counter, a moderate counter, a behind counter, a frequency-increase trigger, a frequency-remain trigger, a frequency-reduction trigger, and a frequency corrector. The ahead counter is adapted to receive the frequency-increase signal, measure a number of the frequency-increase signal, and send out an ahead counting number, further, to reset the number of the frequency-increase signal while receiving a first reset signal. The moderate counter is adapted to receive the frequency-remain signal, measure a number of the frequency-remain signal, and send out a moderate counting number, further, reset the number of the frequency-increase signal while receiving a second reset signal. The behind counter is adapted to receive the frequency-reduction signal, measure a number of the frequency-reduction signal, and send out a behind counting number, moreover, reset the number of the frequency-increase signal while receiving a third reset signal. The frequency-increase trigger is adapted to receive the ahead counting number, generating the first reset signal and a frequency-increase signal if the ahead counting number is larger than a first preset number. The frequency-remain trigger is adapted to receive the moderate counting number, generating the second reset signal and a frequency-remain signal if the moderate counting number is larger than a second preset number. The frequency-reduction trigger is adapted to receive the behind counting number, generating the third reset signal and a frequency-reduction signal if the behind counting number is larger than a third preset number. The frequency corrector is adapted to receive the frequency-increase signal, the frequency-reduction signal and the frequency-remain signal, and to generate the frequency-correcting signal.

The present invention generates a detection window signal according to the clock number during a timing of the last sync pattern signal and a first preset timing, and compares the detection window signal and the sync pattern signal. If the frequency of the clock is too high or the read/write defective region shifts to the fast end, which means that the detection window signal is generated too early or the sync pattern signal will shift toward the back end of the detection window signal, the frequency of the clock signal should be reduced. Contrarily, if the frequency of the clock is too slow or the read/write defective region shifts to the slow end, which means that the detection window signal is generated too late or the sync pattern signal will shift toward the front end of the detection window signal, the frequency of the clock signal should be increased. Accordingly, the present invention corrects the clock frequency, such as the modification of the clock signal by sending the signals above to the clock generator, for improving the reliability of read/write of the compact disk.

In order to make the aforementioned and other contents, features and advantages of the present invention understandable, some preferred embodiments accompanied with figures are described in detail below. In the embodiments, when a device is coupled or connected to another device, it means that the former can be directly or indirectly coupled to the latter. In contrary, when a device is directly coupled or connected to another device, it means that no device, which is a part of the invention, exist between them.

DETAILED DESCRIPTION OF EMBODIMENTS

Figure 1:
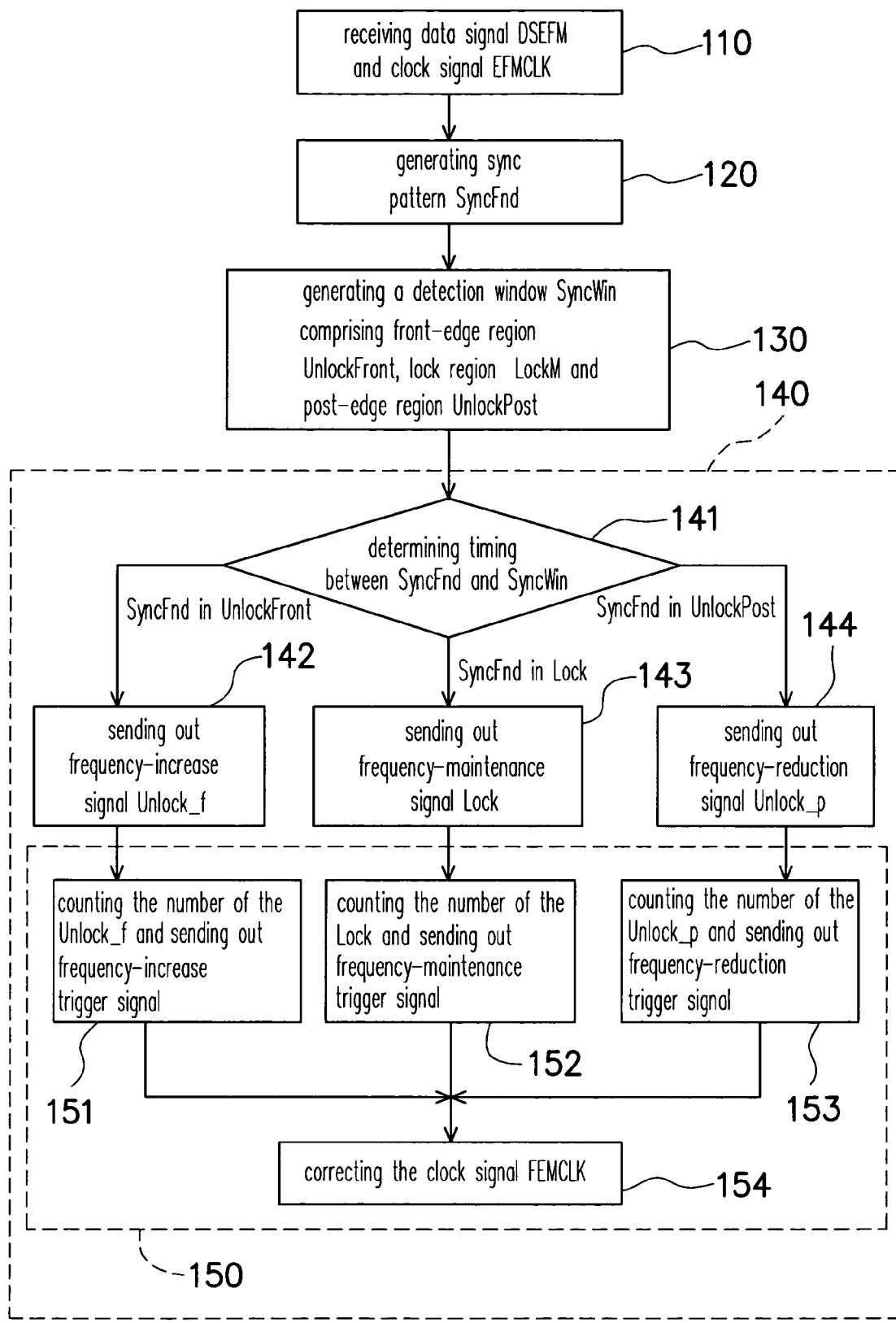
FIG. 1 is a flowchart showing a preferred method of correcting a clock of a compact disk of the present invention.
Figure 2:
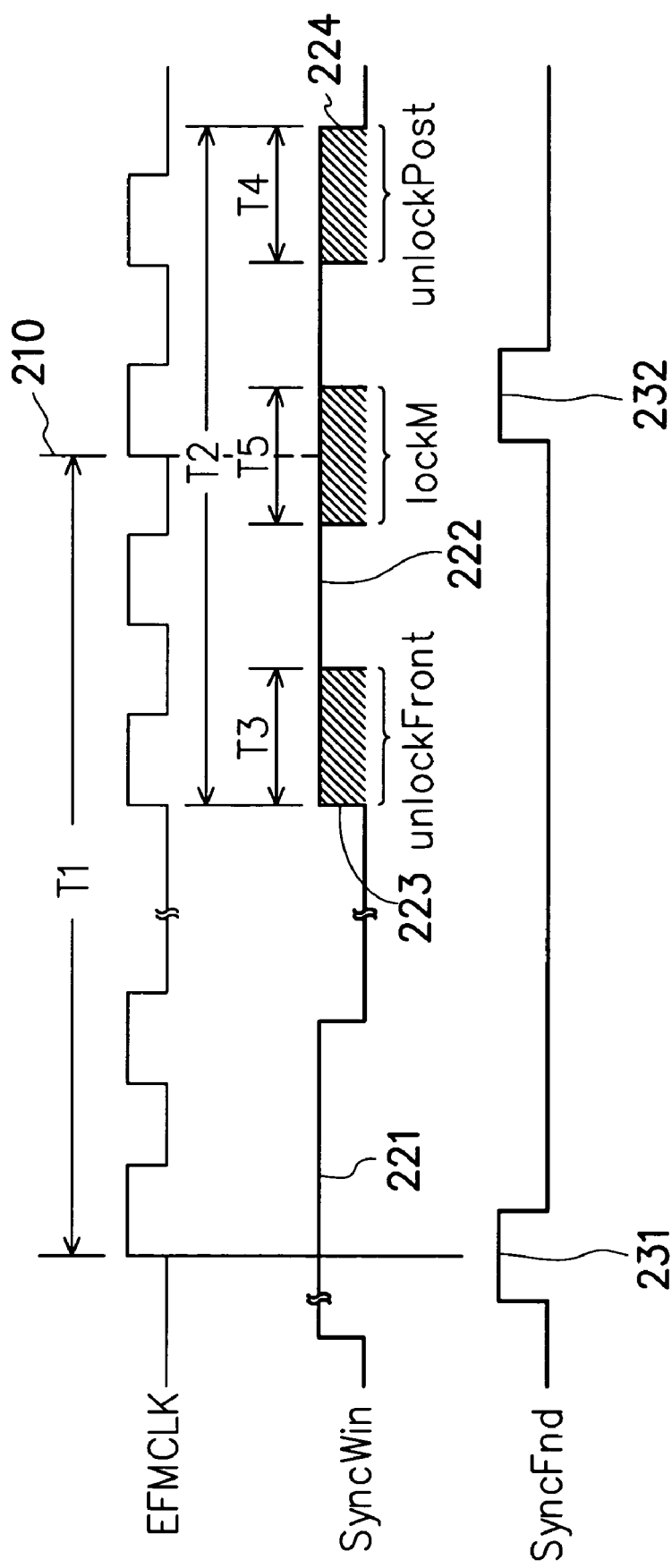
FIG. 2 is clock configuration of a preferred method of correcting a clock of a compact disk of the present invention.

FIG. 1 is a flowchart showing a preferred method of correcting a clock of a compact disk of the present invention. FIG. 2 is clock configuration of a preferred method of correcting a clock of a compact disk of the present invention. Referring to FIGS. 1 and 2, a data signal DSEFM and a clock signal EFMCLK are received in step 110. A sync pattern signal SyncFnd is generated by using the clock signal EFMCLK to detect the data signal DSEFM in step 120. A detection window signal SyncWin is generated according to a clock number during a timing of a last sync pattern signal SyncFnd 231 of FIG. 2 and a preset timing T1 in step 130. The preset timing T1 has, for example, 588 counts of EFMCLK clock signal. In the embodiment, although the timing 210 extends T2/2 back and forward as the clock of the detection window signal SyncWin, it is not limited thereto. The detection window signal width T2 is a preset timing. A clock of the sync pattern signal SyncFnd is compared with the detection window signal SyncWin to correct the clock signal EFMCLK, as shown in step 140.

Referring to FIG. 2, one end of the detection window signal 222 adjacent to a last detection window signal 221 is a signal front-edge 223, and another end of the detection window signal 222 is a signal post-edge 224. A region of the detection window signal 222 within a third preset timing T3 and adjacent to the signal front-edge 223 is a front-edge region unlockFront, and a region of the detection window signal 222 within a fourth preset timing T4 and adjacent to the signal post-edge 224 is a post-edge region unlockPost. In the present invention, a fifth preset timing T5 with a frequency-lock region lockM between the front-edge region unlockFront and the post-edge region unlockPost. A sum of the third preset timing T3, the fourth timing T4 and the fifth timing T5 is no more than the second preset timing T2.

Following are detailed descriptions of the step 140. Referring to FIG. 1 and 2, the step 141 determines timing between SyncEnd and SyneWin (which could be viewed as to determine where the SyncFnd is located in the SyncWin). If it is in the front-edge region unlockFront, the step 142 is performed. If it is in the frequency-lock region lockM, the step 143 is performed. If it is in the post-edge region unlockPost, the step 144 is performed. After a frequency-increase signal is sent out in step 142, the step 150 is performed. After a frequency-remain signal is sent out in step 143, the step 150 is performed. After a frequency-reduction signal is sent out in step 144, the step 150 is performed. The step 150 corrects the clock signal EFMCLK according to the frequency-increase signal, the frequency-reduction signal and the frequency-remain signal.

Following are detailed descriptions of the step 150. Referring to FIG. 1, the step 151 measures and determines whether a number of the frequency-increase signal is larger than a preset counting number N1, wherein if it is, a frequency-increase trigger signal is generated and the number of the frequency-increase signal is reset. The step 152 measures and determines whether a number of the frequency-remain signal is larger than a preset counting number N2, wherein if it is, a frequency-remain trigger signal is generated and the number of the frequency-reduction signal is reset. The step 153 measures and determines whether a number of the frequency-reduction signal is larger than a preset counting number N3, wherein if it is, a frequency-reduction trigger signal is generated and the number of the frequency-remain signal is reset. The step 154 corrects the clock signal EFMCLK according to the frequency-increase signal, the frequency-remain signal and the frequency-reduction signal. For example, the frequency-increase signal, the frequency-reduction signal and the frequency-remain signal are transmitted to a clock generator. Accordingly, the clock generator corrects the clock signal EFMCLK. The preset counting numbers N1, N2 and N3 can be the same counting number or different to each other, which means there is an elasticity to adjust.

Figure 3:
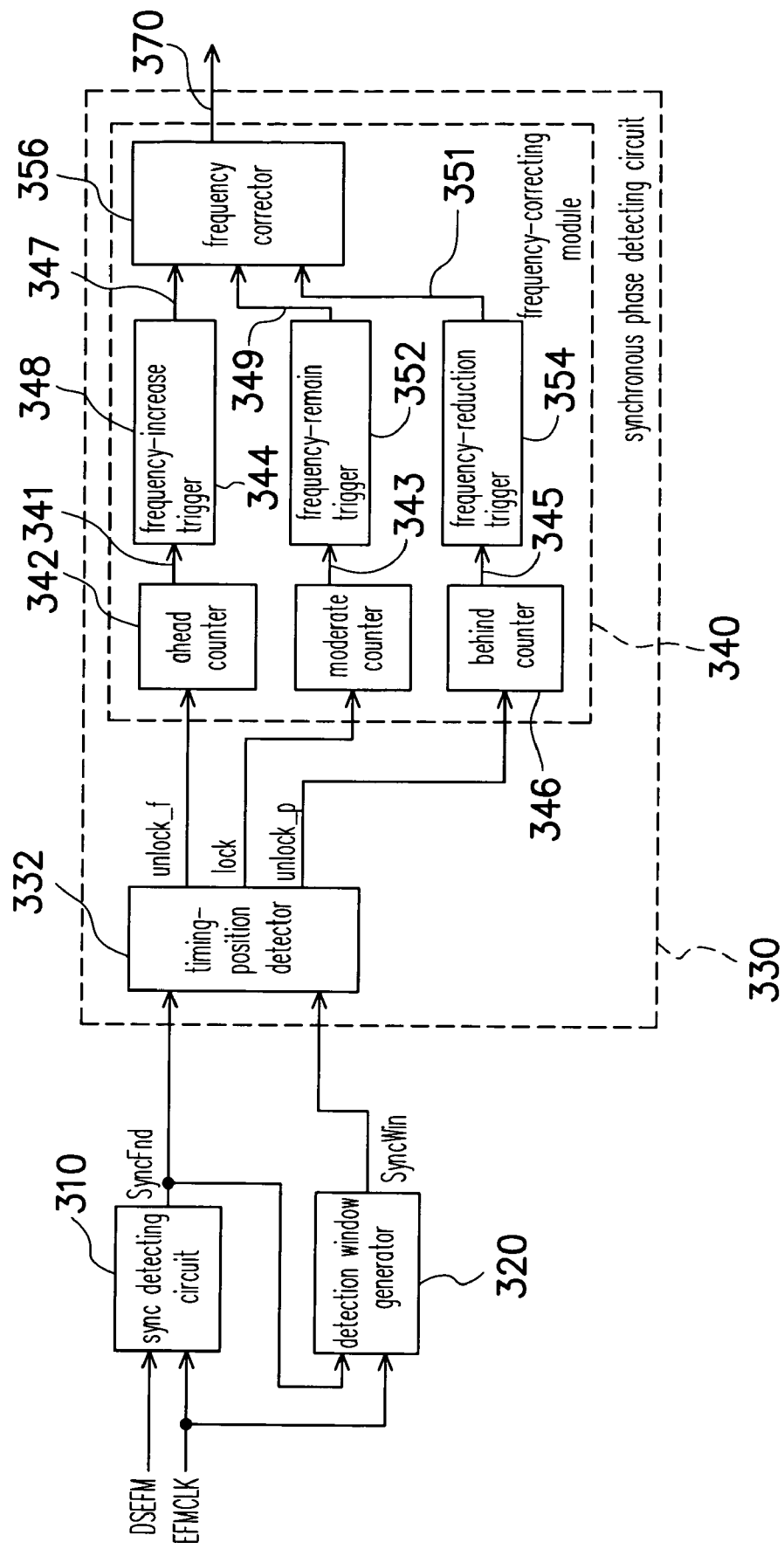
FIG. 3 is a block diagram showing a preferred circuit for correcting a clock of a compact disk of the present invention.

FIG. 3 is a block diagram showing a preferred circuit for correcting a clock of a compact disk of the present invention. Referring to FIGS. 2 and 3, the circuit comprises: a synchronous detecting circuit 310, a detection window generator 320, and a synchronous phase detecting circuit 330. The synchronous detecting circuit 310 is adapted to receive the clock signal EFMCLK and the data signal DSEFM for generating a sync pattern signal SyncFnd by using the clock signal EFMCLK to check the data signal DSEFM. For example, the present invention can use the timing at which the clock signal EFMCLK and the data signal DSEFM change from zero to non-zero, or from non-zero to zero, as the basis of generating the sync pattern signal SyncFnd. Obviously, the synchronous detecting circuit 310 could be a comparator or a generator. The detection window generator 320 is adapted to receive the clock signal EFMCLK and the sync pattern signal SyncFnd 231 of FIG. 2 for generating the detection window signal SyncWin 222 of FIG. 2 according to a clock number during a timing of a last sync pattern signal and the preset timing T1, where the detection window signal has a preset timing width T2. Obviously, the detection window generator 320 could comprise, for example, a clock for measuring T1, and an adder or a subtractor for counting the start and end of the detection window signal SyncWin 222. The synchronous phase detecting circuit 330 is adapted to receive the sync pattern signal SyncFnd and the detection window signal SyncWin for comparing the clock of the sync pattern signal SyncFnd with the detection window signal SyncWin, generating a frequency-correcting signal 370 and correcting the clock signal EFMCLK. The synchronous phase detecting circuit 330 comprises, for example, a comparator for comparing the sync pattern signal SyncFnd and the detection window signal SyncWin, an adder or a subtractor for measuring the relationship between the overlap between the sync pattern signal SyncFnd with the detection window signal SyncWin and the central point of the detection window signal SyncWin 222, and a comparator for determining whether the overlap between the relationship, and the front-edge region, the post-edge region and the frequency-lock region exists.

Following are the descriptions of the synchronous phase detecting circuit 330. Referring to FIGS. 2 and 3, the definition of front-edge region unlockFront, the definition of post-edge region unlockPost and the definition of frequency-lock region lockM are similar to those described above. The synchronous phase detecting circuit 330 comprises a timing-position detector 332 and a frequency-correcting module 340. The timing-position detector 332 is adapted to receive and to determine a relationship between the sync pattern signal SyncFnd and the detection window signal SyncWin, and adapted to send out a frequency-increase signal Unlock_f, a frequency-reduction signal Unlock_p or a frequency-remain signal Lock according to a location of the sync pattern signal SyncFnd in the front-edge region unlockFront, in the post-edge region unlockPost, or in the frequency-lock region lockM, respectively. The frequency-correcting module is adapted to receive the frequency-increase signal Unlock_f, the frequency-reduction signal unlockPost and the frequency-remain signal Lock, and adapted to generate the frequency-correcting signal 370. For example, the frequency-correcting signal 370 is transmitted to the clock-signal generator for changing the frequency of the clock signal.

The circuit for correcting the clock of a compact disk can execute the change after receiving the frequency-increase signal Unlock_f, the frequency-reduction signal Unlock_p and the frequency-remain signal Lock. It may not change the change of the frequency until the measuring frequency shift is out of specification. Referring to the FIG. 3, the frequency-correcting module 340 could further comprise the following: an ahead counter 342, a moderate counter 344, a behind counter 346, a frequency-increase trigger 348, a frequency-remain trigger 352, a frequency-reduction trigger 354, and a frequency corrector 356.

The ahead counter 342 is adapted to receive the frequency-increase signal unlock_f, to measure a number of the frequency-increase signal, and to send out an ahead counting number 341. Moreover, adapted to reset the number of the frequency-increase signal while receiving a first reset signal (not shown). Similarly, the moderate counter 344 is adapted to receive the frequency-remain signal Lock, to measure a number of the frequency-remain signal, and to send out a moderate counting number 343, further, adapted to reset the number of the frequency-remain signal while receiving a second reset signal (not shown). Again, the behind counter 346 is adapted to receive the frequency-reduction signal unlock_p, to measure a number of the frequency-reduction signal, and to send out a behind counting number 345, further, adapted to reset the number of the frequency-reduction signal while receiving a third reset signal (not shown).

The frequency-increase trigger 348 is adapted to receive the ahead counting number 341 to generate the first reset signal (not shown) and a frequency-increase signal 347 for resetting the ahead counter 342 if the ahead counting number is larger than a first preset number N1. The frequency-remain trigger 352 is adapted to receive the moderate counting number 343 to generate the second reset signal (not shown) and a frequency-remain signal 349 for resetting the moderate counter 344 if the moderate counting number is larger than a second preset number N2. The frequency-reduction trigger 354 is adapted to receive the behind counting number 345 to generate the third reset signal (not shown) and a frequency-reduction signal 351 for resetting the behind counter 346 if the behind counting number 345 is larger than a third preset number N3. The frequency corrector 356 is adapted to receive the frequency-increase signal 347, the frequency-remain signal 349 and the frequency-reduction signal 351, and to generate the frequency-correcting signal 370. The preset counting numbers N1, N2 and N3 can be the same counting number or different to each other.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A method of correcting a clock of a compact disk, comprising:

receiving a data signal and a clock signal;

generating a sync pattern signal by using the clock signal to detect the data signal;

generating a detection window signal according to a clock number during a timing of a last sync pattern signal and a first preset timing, the detection window signal having a second preset timing width; and comparing a clock of the sync pattern signal with the detection window signal, and correcting the clock signal, wherein one end of the detection window signal adjacent to a last detection window signal is a signal front-edge, another end of the detection window signal is a signal post-edge, a region of the detection window signal within a third preset timing adjacent to the signal front-edge is a front-edge region, a region of the detection window signal within a fourth preset timing adjacent to the signal post-edge is a post-edge region, a sum of the third preset timing and the fourth preset timing is no more than the second preset timing, the step of comparing the clock of the sync pattern signal with the detection window signal further comprising:

determining whether the sync pattern signal is in the front-edge region, wherein if it is, a frequency-increase signal is sent out;

determining whether the sync pattern signal is in the post-edge region, wherein if it is, a frequency-reduction signal is sent out;

determining whether the sync pattern signal is between the front-edge region and the post-edge region, wherein if it is, a frequency-remain signal is sent out; and correcting the clock signal according to the frequency-increase signal, the frequency-reduction signal and the frequency-remain signal.

2. The method of correcting a clock of a compact disk of claim 1, wherein the sync pattern signal is generated when the clock signal and the data signal change from zero to non-zero simultaneously.

3. The method of correcting a clock of a compact disk of claim 1, wherein the sync pattern signal is generated when the clock signal and the data signal change from non-zero to zero simultaneously.

4. The method of correcting a clock of a compact disk of claim 1, further comprising a fifth preset timing with a frequency-lock region between the front-edge region and the post-edge region, a sum of the third preset timing, the fourth timing and the fifth timing is no more than the second preset timing.

5. The method of correcting a clock of a compact disk of claim 4, further comprising determining whether the sync pattern signal is in the frequency-lock region, wherein if it is, the frequency-remain signal is sent out.

6. The method of correcting a clock of a compact disk of claim 5, wherein the step of correcting the clock signal according to frequency-increase signal, the frequency-reduction signal and the frequency-remain signal further comprising:

measuring and determining whether a number of the frequency-increase signal is larger than a first preset counting number, wherein if it is, a frequency-increase trigger signal is generated and the number of the frequency-increase signal is reset;

measuring and determining whether a number of the frequency-reduction signal is larger than a second preset counting number, wherein if it is, a frequency-reduction trigger signal is generated and the number of the frequency-reduction signal is reset;

measuring and determining whether a number of the frequency-remain signal is larger than a third preset counting number, wherein if it is, a frequency-remain trigger signal is generated and the number of the frequency-remain signal is reset; and correcting the clock signal according to the frequency-increase trigger signal, the frequency-reduction trigger signal and the frequency-remain trigger signal.

7. The method of correcting a clock of a compact disk of claim 6, wherein the first preset counting number, the second preset counting number and the third preset counting number are the same preset counting number.

8. The method of correcting a clock of a compact disk of claim 6, wherein the first preset counting number, the second preset counting number and the third preset counting number are different from each other.

9. A circuit for correcting a clock of a compact disk, comprising:

a synchronous detecting circuit, adapted to receive a clock signal and a data signal for generating a sync pattern signal by using the clock signal to detect the data signal;

a detection window generator, adapted to receive the clock signal and the sync pattern signal for generating a detection window signal according to a clock number during a timing of a last sync pattern signal and a first preset timing, the detection window signal having a second preset timing width; and a synchronous phase detecting circuit, adapted to receive the sync pattern signal and the detection window signal for comparing a clock of the sync pattern signal with the detection window signal, and generating a frequency-correcting signal according to the compare result for correcting the clock signal, wherein one end of the detection window signal adjacent to a last detection window signal is a signal front-edge, another end of the detection window signal is a signal post-edge, a region of the detection window signal within a third preset timing adjacent to the signal front-edge is a front-edge region, a region of the detection window signal within a fourth preset timing adjacent to the signal post-edge is a post-edge region, a sum of the third preset timing and the fourth preset timing is no more than the second preset timing, the synchronous phase detecting circuit comprising;

a timing-position detector, adapted to receive and determine whether a relationship between the sync pattern signal and the detection window signal, sending out a frequency-increase signal, a frequency-reduction signal or a frequency-remain signal according to a location of the sync pattern signal in the front-edge region, the post-edge region, or between the front-edge region and the post-edge region, respectively; and a frequency-correcting module, adapted to receive the frequency-increase signal, the frequency-reduction signal and the frequency-remain signal, and generate the frequency-correcting signal.

10. The circuit for correcting a clock of a compact disk of claim 9, wherein the sync pattern signal is generated when the clock signal and the data signal change from zero to non-zero simultaneously.

11. The circuit for correcting a clock of a compact disk of claim 9, wherein the sync pattern signal is generated when the clock signal and the data signal change from non-zero to zero simultaneously.

12. The circuit for correcting a clock of a compact disk of claim 9, wherein the frequency-correcting module comprises:
- an ahead counter, adapted to receive the frequency-increase signal, measure a number of the frequency-increase signal, send out an ahead counting number, and reset the number of the frequency-increase signal while receiving a first reset signal;
- a moderate counter, adapted to receive the frequency-remain signal, measure a number of the frequency-remain signal, send out a moderate counting number, and reset the number of the frequency-remain signal while receiving a second reset signal;
- a behind counter, adapted to receive the frequency-reduction signal, measure a number of the frequency-reduction signal, send out a behind counting number, and reset the number of the frequency-reduction signal while receiving a third reset signal;
- a frequency-increase trigger, adapted to receive and check the ahead counting number, moreover, adapted to generate the first reset signal and a frequency-increase trigger signal if the ahead counting number is larger than a first preset number;
- a frequency-remain trigger, adapted to receive and check the moderate counting number, moreover, adapted to generate the second reset signal and a frequency-remain trigger signal if the moderate counting number is larger than a second preset number;
- a frequency-reduction trigger, adapted to receive and check the behind counting number, moreover, adapter to generate the third reset signal and a frequency-reduction trigger signal if the behind counting number is larger than a third preset number; and
- a frequency corrector, adapted to receive the frequency-increase trigger signal, the frequency-reduction trigger signal and the frequency-remain trigger signal, and generate the frequency-correcting signal.

13. The circuit for correcting a clock of a compact disk of claim 12, wherein the first preset counting number, the second preset counting number and the third preset counting number are the same preset counting number.

14. The circuit for correcting a clock of a compact disk of claim 12, wherein the first preset counting number, the second preset counting number and the third preset counting number, is different to each other.

* * * * *